US009346693B2

(12) United States Patent
Holt

(10) Patent No.: US 9,346,693 B2
(45) Date of Patent: *May 24, 2016

(54) POLYMER BLENDS FOR FLOCCULATION

(71) Applicant: PSMG, LLC, Woodstock, GA (US)

(72) Inventor: Jason Holt, Ball Ground, GA (US)

(73) Assignee: PSMG, LLC, Woodstock, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/288,849

(22) Filed: May 28, 2014

(65) Prior Publication Data

US 2014/0263082 A1    Sep. 18, 2014

Related U.S. Application Data

(63) Continuation of application No. 13/861,901, filed on Apr. 12, 2013.

(51) Int. Cl.
| *B01D 21/01* | (2006.01) |
| *B03D 3/00* | (2006.01) |
| *C02F 1/52* | (2006.01) |
| *C02F 1/56* | (2006.01) |
| *C02F 1/54* | (2006.01) |
| *B01D 21/02* | (2006.01) |
| *C02F 1/00* | (2006.01) |

(Continued)

(52) U.S. Cl.
CPC .............. *C02F 1/5272* (2013.01); *B01D 21/02* (2013.01); *C02F 1/54* (2013.01); *C02F 1/56* (2013.01); *B01D 21/01* (2013.01); *B03D 3/00* (2013.01); *C02F 2103/10* (2013.01)

(58) Field of Classification Search
None
See application file for complete search history.

(56) References Cited

U.S. PATENT DOCUMENTS

| 3,843,589 A | 10/1974 | Wartman |
| 4,710,298 A | 12/1987 | Noda et al. |
| 4,795,531 A | 1/1989 | Sofia et al. |

(Continued)

FOREIGN PATENT DOCUMENTS

| EP | 0203817 | 12/1986 |
| EP | 0522334 | 1/1993 |
| EP | 0536194 | 4/1993 |

OTHER PUBLICATIONS

International Search Report and Written Opinion for co-pending PCT application PCT/US 14/17669 dated May 22, 2014.

(Continued)

*Primary Examiner* — Nam Nguyen
*Assistant Examiner* — Clare Perrin
(74) *Attorney, Agent, or Firm* — Dardi & Herbert, PLLC; Peter S. Dardi; Kayla Fossen

(57) ABSTRACT

Polymer flocculants are described comprising blends of high molecular weight polyethylene oxide and high molecular polyacrylamides. When introduced in desired amounts and with desired molecular weight ranges, excellent flocculation function is found that can be used to reduce polymer consumption to obtain a desired purity of clarified waste water. It has been found that the desirable polymer blends can be effectively added upstream from locations in which polyethylene oxide would generally be added so that the polymer blend can effectively mix with the slime flow to reduce or eliminate the need for excess polymer use to compensate for less effective mixing with the slime flow. Suitable waste treatment systems are described to provide for the delivery of the flocculants in the waste treatment process.

17 Claims, 1 Drawing Sheet

(51) Int. Cl.
  *B01D 21/00* (2006.01)
  *C02F 103/10* (2006.01)

(56) References Cited

U.S. PATENT DOCUMENTS

| | | | | |
|---|---|---|---|---|
| 4,931,190 | A | * | 6/1990 | Laros ............................ 210/710 |
| 5,102,455 | A | * | 4/1992 | Allen et al. ..................... 75/772 |
| 5,112,500 | A | | 5/1992 | Jones |
| 5,178,770 | A | | 1/1993 | Chung |
| 5,342,538 | A | | 8/1994 | Chung et al. |
| 5,366,622 | A | | 11/1994 | Geyer |
| 5,449,464 | A | | 9/1995 | El-Shall |
| 5,549,820 | A | * | 8/1996 | Bober et al. .................. 210/199 |
| 5,650,465 | A | * | 7/1997 | Ryan et al. .................... 524/801 |
| 6,123,856 | A | | 9/2000 | Kumpera et al. |
| 6,238,486 | B1 | | 5/2001 | Dunham et al. |
| 6,358,364 | B2 | * | 3/2002 | Keiser et al. ............... 162/181.6 |
| 6,846,416 | B2 | * | 1/2005 | Nasu et al. .................... 210/638 |
| 6,979,405 | B2 | * | 12/2005 | Weir ............................. 210/727 |
| 7,252,783 | B2 | | 8/2007 | Weir et al. |
| 2005/0061750 | A1 | | 3/2005 | Fabri et al. |
| 2005/0115907 | A1 | | 6/2005 | Taylor |
| 2010/0038319 | A1 | * | 2/2010 | Boehm et al. ................. 210/710 |
| 2014/0158634 | A1 | | 6/2014 | Holt |

OTHER PUBLICATIONS

Scheiner et al., "Dewatering of mineral waste using the flocculant polyethylene oxide," Bulletin/U.S. Dept. of the Interior, Bureau of Mines; 681 (1985).

Ecolab USAs Inc., PARETO Mixing Technology brochure, © 2012, 9 pages.

Han et al., "Density, Viscosity, and Excess Properties for Aquaeous Poly(ethykene glycol) Solutions (298.15 to 323.15) K," Journal of Chemical & Engineering Data, (Oct. 22, 2008), vol. 53(11):2598-2601.

Smelley at al., "Synergism in polyethylene dewatering of phosphatic clay waste," U.S. Dept. of the Interior, Bureau of Mines, 1980.

* cited by examiner

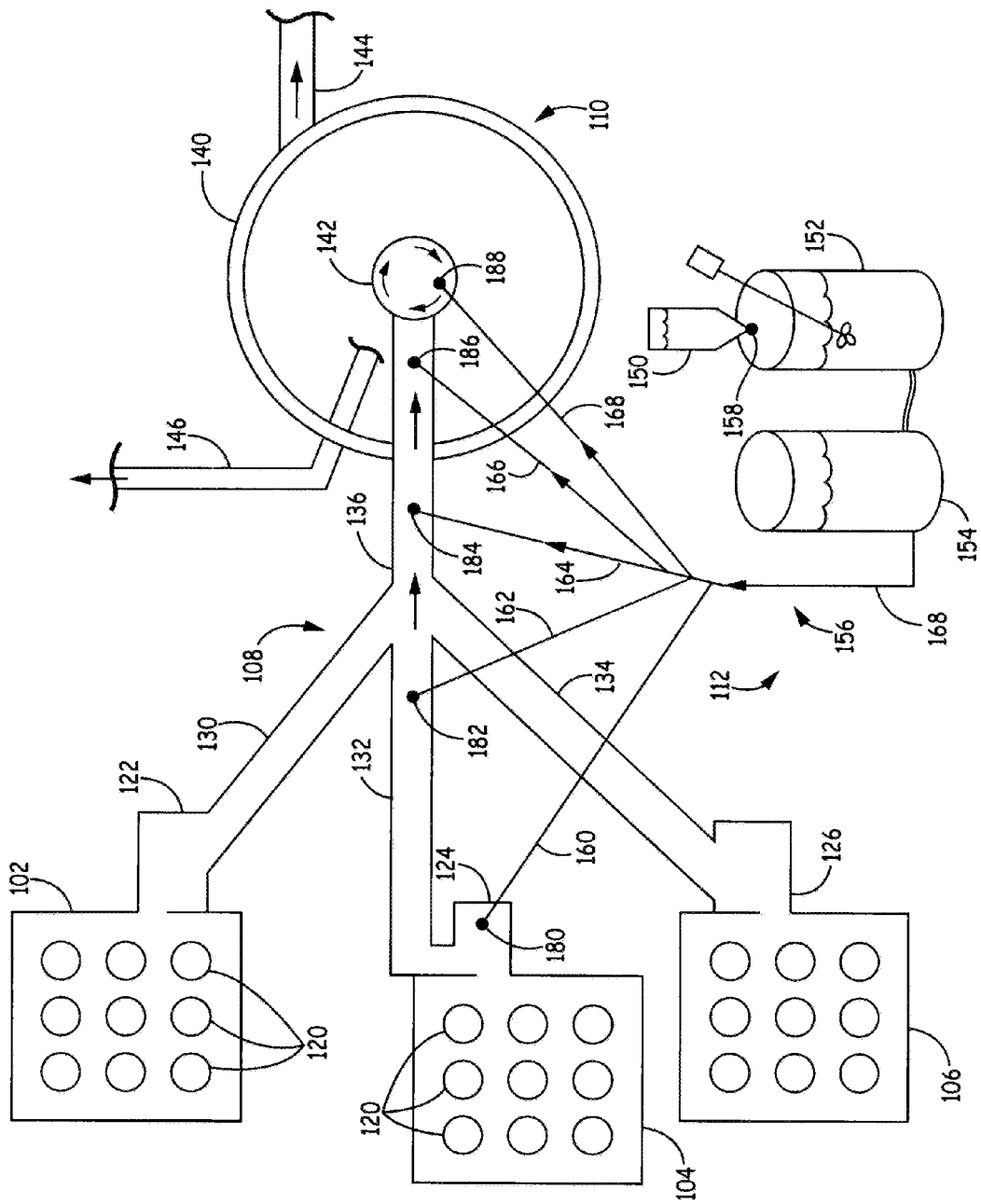

POLYMER BLENDS FOR FLOCCULATION

CROSS REFERENCE TO RELATED APPLICATIONS

This application is a continuation of U.S. patent application Ser. No. 13/861,901 filed on Apr. 12, 2013 entitled "Polymer Blends for Flocculation," incorporated herein by reference.

FIELD OF THE INVENTION

The invention relates to polymer flocculants to facilitate concentration of particulates in waste streams, such as mining waste streams. The invention further relates to processes using the polymer flocculants.

BACKGROUND OF THE INVENTION

Various waste streams have particulate contaminants that should be removed or concentrated for proper disposal. Traditionally, ponds have been used for dewatering the sludge or slime, but ponding is undesirable due to large areas of lands needed as well as associated environmental, economic, aesthetic and safety reasons. Addition of flocculants to the waste stream can facilitate concentration of particulate wastes. In particular, phosphate mining produces clay and clay like particulates. Economic constraints drive the use of flocculants with respect to efficiency and cost of the processing.

SUMMARY OF THE INVENTION

In a first aspect, the invention pertains to a flocculant composition comprising a blended mixture of polyethylene oxide having an average molecule weight of at least about 1 million g/mol and a polyacrylamide having an average molecule weight of at least about 22.5 million g/mol. Generally, the flocculant composition can have a concentration of polyethylene oxide from about 35 weight percent to about 85 weight percent and a concentration of polyacrylamide from about 15 weight percent to about 65 weight percent.

In further aspects, the invention pertains to a method for performing flocculation on a waste stream using a flocculant composition comprising a polymer blend of a polyethylene oxide polymer and a polyacrylamide, wherein the flocculant composition has a concentration of polyethylene oxide from about 35 weight percent to about 85 weight percent and a concentration of polyacrylamide from about 15 weight percent to about 65 weight percent, and wherein polyacrylamide has a molecular weight of at least about 15 million g/mol. The method generally comprises combining an aqueous solution of the flocculant composition with a waste stream comprising particulates to form settling flocculants, in which the combining of the aqueous solution with the waste stream is performed at least about 10 meters upstream from a port into a thickening tank.

In additional aspects, the invention pertains to a waste treatment system comprising a thickening tank, an inflow conduit, a polymer mixing tank and a feed line. The thickening tank generally can have a central inflow, an outflow for clarified water positioned at or near an edge configured to remove water from the top 40 percent of the tank, and an outflow for concentrated tailings configured to remove thickened material from the bottom 20 percent of the tank. The inflow conduit can be connected with the central inflow of the settling tank with the inflow conduit connecting to a mineral processing station to collect slimes form the mineral processing station and connected to the central inflow of the settling tank. The polymer mixing tank can comprise a reservoir of a flocculant composition and a mixer configured to form an aqueous solution of the polymer blend, with the flocculant composition comprising a blend of a polyethylene oxide polymer and a polyacrylamide, in which the flocculant composition has a concentration of polyethylene oxide from about 35 weight percent to about 85 weight percent and a concentration of polyacrylamide from about 15 weight percent to about 65 weight percent, and in which polyacrylamide has a molecular weight of at least about 15 million g/mol. The feed line generally can connect the polymer mixing tank and the inflow conduit with an inlet from the feed line into the inflow conduit being at least about ten meters from the central inflow of the mixing tank.

BRIEF DESCRIPTION OF THE DRAWINGS

FIG. 1 is a top schematic view of the layout of a waste treatment facility involving the delivery of a polymer flocculant into a waste stream from mineral processing stations as the tailings, i.e., the waste stream, flow to a thickening tank (thickener).

DETAILED DESCRIPTION

Synergistic flocculant performance has been found with a blend of high molecular weight polyethylene oxide polymers with high molecular weight polyacrylamides with relatively high proportions of polyethylene oxide. In particular, the polyacrylamide polymer generally can effectively have a higher molecular weight than the corresponding polyethylene polymer in the blend, and the polyacrylamide is observed to thicken solutions formed with the polymer blend. As is conventional in the art, reference to polyacrylamide includes various copolymers, and polyacrylamides are available commercially at very high molecular weights. Polyacrylamides have been found to provide synergistic improvement in the flocculant function of polyethylene oxide when introduced at appropriate relative amounts and especially with very high molecular weights. In general, the polyethylene oxide has an average molecular weight of at least 1 million grams/mole (g/mol), and the polyacrylamide generally has an average molecular weight of at least about 22.5 million g/mol. The polymer blend is generally dissolved into water to form a relatively dilute polymer solution that is then blended into a waste stream to provide the flocculant function with respect to particles in the waste stream. Due to the synergistic improvement in flocculant function of the polymer blends, a smaller overall amount of polymer can be used with corresponding processing advantages and cost effectiveness.

Flocculants are useful for the treatment generally of waste streams, generally from mines, to agglomerate particulates that can then settle from the waste stream and to facilitate concentration of the particulates. Mines generally produce flow of relatively dilute waste stream with tailings, also referred to as mineral slimes. To reasonably dispose of the mineral slimes, the concentration of particulates can be concentrated. The polymer flocculants described herein can be effective to form flocculants, for example, with clay, claylike waste or other silicate or metal oxide particulate waste, which can be produced in various mining operations, such as phosphate mining, bauxite mining, coal washing, dredging, talc mining, other sand mining deposits, alumina processing and the like. The dissolved polymer flocculants can be injected into the stream containing suspended solids that is then directed to a settling tank, or the like. Processing with the polymer flocculants is described further below.

The polymer flocculant composition comprises a blend of polyethylene oxide and the polyacrylamide, which in some embodiments can have a very high molecular weight. Generally, the composition has a ratio of polyethylene oxide to polyacrylamide from about 0.667 to about 5, in further embodiments from about 0.75 to about 4.5, in additional embodiments from about 0.85 to about 4.25, and in other embodiments from about 1 to about 4. Also, the composition can comprise at least about 35 weight percent polyethylene oxide, in further embodiments from about 45 weight percent to about 90 weight percent, and in additional embodiments from about 50 weight percent to about 85 weight percent polyethylene oxide. A person of ordinary skill in the art will recognize that additional ranges within the explicit composition ranges above are contemplated and are within the present disclosure.

Polyethylene oxide can be represented by the formula —(O—CH$_2$—CH$_2$)$_n$—OH, where n refers to the degree of polymerization, and for high molecular weight polymers, n is large. Low molecular weight variations of this polymer can be called polyethylene glycol or PEG. The nature of the polymer can be characterized by the average molecular weight and suitable polymers can be linear or branched. In general, the average molecular weight of the polyethylene oxide can be at least about 1 million g/mol, in other embodiments at least about 3 million g/mol, and in additional embodiments from about 4 million g/mol to 11 million g/mol. A person of ordinary skill in the art will recognize that additional ranges of polyethylene oxide molecular weight within the explicit ranges above are contemplated and are within the present disclosure. Suitable commercial high molecular weight polyethylene oxides are available from Dow Chemical, for example, Polyox WSR™ 308 or UCARFLOC™ 309, 304, etc.

Polyacrylamide is represented by the formula —(CH$_2$CH(CONH$_2$))$_n$—, which is an amide form of polyacrylic acid. Copolymers of acrylamide can be similarly referred to as an acrylamide, and various copolymers introduce an ionic character into the polymer. For example, some polyacrylamides are copolymers of acrylamide and acrylic acid. Thus, a polyacrylamide can be non-ionic, anionic, cationic or amphoteric, and generally these various forms of polyacrylamide are suitable for forming the synergistically improved flocculant compositions. Charged polyacrylamides can be designed with varying amounts of copolymers constituents to vary the amount of charge, e.g., with charged monomers generally varying from about 10 to about 50 percent of the polymer chain. The lab bench results below suggest that the charge is not a significant parameter for the flocculant function of the polyacrylamides in the polymer blends. In general, anionic polyacrylamides have found use in the waste stream treatment process. The molecular weight of the polyacrylamide has been found to be a significant aspect with respect to the discovered improvement of the polymer blends. In particular, it is generally desirable for the polyacrylamide to have a higher average molecular weight relative to the average molecular weight of the polyethylene oxide. Generally, the polyacrylamide has an average molecular weight of at least about 16 million g/mol, in further embodiments at least about 18 million g/mol, and in further embodiments at least about 19 million g/mol, and particularly improved results have been discovered for polyacrylamides with an average molecular weight of at least 22 million g/mol, in further embodiments at least about 22.5 million g/mol, in some embodiments at least about 23 million g/mol, in additional embodiments at least about 24 million g/mol and in other embodiments at least about 25 million g/mol. A person of ordinary skill in the art will recognize that additional ranges of molecular weights within the explicit ranges above are contemplated and are within the present disclosure. Suitable high molecular weight polyacrylamides are available commercially, for example, from Kemira™ (e.g., 130A 18-20M mw), SNF Floeger™ (e.g., 934VHM 20-22M mw) and Hengju Polymers (Hengflox™).

For use the polymer blends are conveniently blended in a powder form and distributed as a homogenous blend to ultimate users. The powder blends can be formed in a suitable mixer and delivered into a bag or other container for distribution. In alternative or additional embodiments, individual quantities of the polymers can be fed to a polymer mixing tank in metered quantities, but such a configuration involves a more complex feed structure and a mixing structure configured to obtain good mixing of the polymers prior to dispensing of the mixed polymer solution to a feed line for use. Regardless of the approach for the delivery of the polymers to form a polymer solution, for use as a flocculant, the polymer blend is generally formed into a dilute aqueous solution generally at a concentration from about 0.0005 to about 0.2 weight percent, in further embodiments from about 0.001 to about 0.1 weight percent and in additional embodiments form about 0.002 to about 0.05 weight percent polymer. A person of ordinary skill in the art will recognize that additional ranges within the explicit ranges above are contemplated and are within the present disclosure.

A flocculant based on a combination of polyacrylamide and high molecular weight polyethylene oxide is described in U.S. Pat. No. 4,931,190 to Laros, entitled "Flocculating Agent Combinations for Mineral Slime Filtration Systems," incorporated herein by reference. The flocculating agents in the '190 patent do not reference the synergistic effect of having particularly high molecular weights of polyacrylamides as described herein, and generally have other distinctions from many of the embodiments described herein. As described further below, flocculants comprising polymer blends with a large fraction, e.g., in some embodiments a majority by weight, of high molecular weight polyethylene oxide modifies the desired delivery approach for the flocculant into the waste stream processing system, which has been discovered as described herein.

The use of the polymer composite flocculants provides for more flexible delivery of the flocculant into the waste stream. With the use of a polyacrylamide flocculant, the flocculant is generally added in part early in the waste flow with additional portions added along the flow to drive a relatively slow flocculation process to a relatively effective end point. With the use of polyethylene oxide alone, it is generally desirable to add the flocculant essentially at or near the point of entry of the waste flow into a settling tank due to the relatively rapid flocculation effect. With respect to the polymer blends described herein, the flocculant can be added upstream in the waste flow from the try point into the settling tank or center well. Proper mixing of the polymer blend facilitates this earlier delivery without interfering with the desirable flow of the waste stream through conduits leading to a settling tank. The earlier delivery of flocculant provides for improved mixing within the waste flow, which can result in the reduced use of flocculant while improving the effectiveness of the flocculant. In particular, in some embodiments the polymer blend is added at least 10 meters upstream from a port, e.g., central inlet, into a settling tank.

A representative configuration of a waste treatment facility for the treatment of waste water with mining tailings is shown in FIG. 1. The waste treatment facility for a mining operation comprises mineral processing stations 102, 104, 106, slime flow conduit system 108, thickening tank 110 and polymer flocculant delivery system 112. The configuration of the mineral processing stations can depend on the particular mining operation, and these stations can comprise hydrocyclones 120 or the like or other suitable purification equipment to separate crudely purified mineral ore from slimes, i.e., dilute tailing waste from the mineral separation. In some embodiments, a mineral processing station can comprise a head box 122, 124, 126 to direct slime/waste flow from a mineral processing station to the waste flow conduit system. While FIG. 1 shows three mineral processing stations 102, 104, 106, in other embodiments a waste facility may interface with a single mineral processing station, two, four, five or more than five mineral processing stations.

Slime flow conduit system 108 provides for flow of the waste stream from mineral processing stations 102, 104, 106 to thickening tank 110, and generally slime flow conduit system 108 interfaces with polymer flocculant delivery system 112 at one or more points. With the configuration shown in FIG. 1, slime flow conduit system 108 comprises flow lines 130, 132, 134 that lead to combined flow line 136. Flow lines 130, 132, 134, respectively connect to head boxes 122, 124, 126 to receive slimes from mineral processing stations 102, 104, 106, respectively. The size and construction of flow lines 130, 132, 134, 136 can be designed based on the particular mining operation and corresponding waste volumes, and flow limes 130, 132, 134, 136 can be pipes, open or closed ducts or any other suitable flow structure. For a representative phosphate mining operation flow lines 130, 132, 134 can be pipes with a diameter of roughly 10-40 inches, and combined flow line 136 can be a pipe with a diameter of roughly 30-60 inches, but the basic teachings herein can apply to a range of processing operations and mining volumes. As noted above, a particular system can comprise a different number of mineral processing stations and corresponding modifications to slime flow conduit system 108 follow from the teachings herein.

Thickening tank 110 can comprise a tank structure 140, a central inlet 142, a clarified water outflow 144 and a tailings outflow 146. Tank structure 140 can have a suitable volume for the particular mining operation size. Central inlet 142 provides an interface with combined flow conduit 136 such that slime can enter the tank structure 140. Central inlet 142 can be simply an end opening of combined flow conduit 136, but in some embodiments, central inlet 142 can comprise a circular ring like structure with optional mechanical mixing to provide for a mixed slime flow into tank structure 140 to facilitate flocculation. In the thickening process that takes place in tank structure 140, the flocculates solids have a higher density and fall to the bottom of the tank, and less dense clarified water can be found near the top of the tank. Clarified water outflow 144 can be configured to take off water from near the top of the tank, such as the top 20%-40% of the tank volume and in further embodiments the top 10% of the tank volume, and in general near the edge of the tank. Similarly, tailings outflow 146 can be configured to withdraw concentrated tailings from the flocculation process near the bottom of the tank and in some embodiments toward the center of the tank, in some embodiments from the bottom 20% of the tank volume and in further embodiments from the bottom 10% of the tank volume. A person of ordinary skill in the art will recognize that additional ranges of positions for water removal within the explicit ranges above are contemplated and are within the present disclosure.

Referring to FIG. 1, polymer flocculant delivery system 112 comprises a dry polymer reservoir 150, a mixing tank 152, a storage tank 154 and feed lines 156. Dry polymer reservoir 150 generally holds a desired quantity of the selected polymer blend and can comprise a feed valve 158 or the like to provide for the placement of a selected amount of polymer into mixing tank. Mixing tank 152 generally has an appropriate mixing element and can be configured generally to operate in a batch or continuous mode of operation. Water is generally correspondingly delivered into mixing tank 152 to provide a desired concentration of polymer solution, as described above. The mixed polymer solution can be pumped or otherwise flowed for storage to storage tank 154 for delivery as needed to the waste stream through feed lines 156.

Feed lines 156 provide for flow from storage tank 154 to slime flow conduit system 108, and pumps can be used as appropriate to drive the flow. As shown in FIG. 1, feed lines 156 comprise 5 branch feeds 160, 162, 164, 166, 168 from main feed line 168, which connects with storage tank 154. The feed lines can be appropriate pipes or other conduits. Branch feeds 160, 162, 164, 166, 168 connect between main feed line 168 and delivery connections 180, 182, 184, 186, 188 that connect with corresponding points of the slime flow conduit system. As shown in FIG. 1, delivery connection 180 is located at head box 124, delivery connection 182 is on flow conduit 132, delivery connections 184, 186 are located at different points on combined flow conduit 136, and delivery connection 188 is located at central inlet 142. In additional or alternative embodiments, a different number of branch flow conduits can be used, such as 1, 2, 3, 4, 6 or more than 6, and the positions of the delivery connections can be altered as desired. Similarly, a system can comprise more than 1 polymer flocculant delivery system if desired to supply polymer solution to various delivery connections.

As noted above, based on the improved polymer blends described herein the solution of the polymer blend can be effectively added at selected locations along the slime flow. While polyethylene oxide alone as a flocculant has desirable properties, the flocculant action of the polyethylene oxide is most effective when the flocculant solution is added essentially at the central inlet into the thickening tank, e.g., delivery connection 188 in FIG. 1. The delivery of the polymer flocculant solution at or near the central inlet limits the mixing with the waste stream prior to entry into the thickening tank. It has been discovered that the flocculant polymer blends described herein provide for earlier introduction into the waste flow to provide better mixing with the waste flow. Overall the polymer blends provide outstanding flocculant function and improved delivery flexibility. In contrast with high molecular weight polyethylene oxide alone, the flocculant polymer blends can be delivered effectively through a delivery port into the slime flow at least 10 meters from the port connecting the waste flow with the thickening tank settling zone, in further embodiments at least about 12 meters and in additional embodiments from 15 meters to the initiation of the waste flow adjacent to the mineral processing station. A person of ordinary skill in the art will recognize that additional ranges of distances within the explicit ranges above are contemplated and are within the present disclosure.

While the polymer blend flocculants can be effectively used in various waste processing situations, it is instructive to review a representative procedure. For example, a slime flow coming from the mineral processing stations can have a solids concentration from about 1 weight percent to about 12 weight percent. The objective can be to concentrate to solids in the waste to levels generally from about 15 to about 45 weight percent and in further embodiments from about 20 to about 35 weight percent in the under flow removed from the thickening tank. The clarified water removed from the thickening tank can have at least about 90 percent, in some embodiments at least about 95 percent, and in further embodiments at least about 99 of the initial solids removed. In general, the volume of polymer flocculant solution is added in a dosage from about 1 parts per million by weight (ppm) to about 50 ppm, in some embodiments from about 5 ppm to about 40 ppm, and in further embodiments from about 10 ppm to about 30 ppm of polymer flocculant within the treated slime flow, i.e., 1 part polymer per million parts of waste water by weight assuming that the waste water is 1 kg per liter. A person of ordinary skill in the art will recognize that additional ranges of processing parameters within the explicit ranges above are contemplated and are within the present disclosure. The improved polymer blends and/or the improved delivery of the polymer blends provide for a reduced use of polymer in order to achieve a desired high purity of water effluent.

Bench level testing has been used to examine the flocculant function. Specifically, 500 milliliters of clay containing water is added to a graduated cylinder. Then, 10 milliliters of dilute polymer solution is added and mixed into the waste dispersion in the beaker, and the flocculation process is visually observed. Secondly, after flocculation and settling has been observed, 500 additional milliliters of additional untreated clay containing water is added, while no additional polymer solution is added to the now 1000 milliliter volume. The graduated cylinder containing the total solution was then inverted multiple times (15 reps) to observe the initial polymer solutions "reserved" ability to flocculate and clarify the additional clay water solution in order to simulate downstream introductions of suspended solids post polymer solution addition. The bench testing was performed with polymer concentrations of about 0.01 weight percent with 1) polyethylene oxide (8 million g/mol), 2) 70 wt % polyethylene oxide and 30 wt % anionic polyacrylamide (20-22 million g/mol), 3) 70 wt % polyethylene oxide and 30 wt % anionic polyacrylamide (26 million g/mol), 4) 70 wt % polyethylene oxide and 30 wt % anionic polyacrylamide (16 millions g/mol), 5) 55 wt % polyethylene oxide and 45 wt % anionic polyacrylamide (16 millions g/mol) and 6) 55 wt % polyethylene oxide and 45 wt % anionic polyacrylamide (26 millions g/mol).

Flocculant solution 1 exhibited rapid changes due to rapid flocculant (floc) formation which then settled to yield a relatively clear supernatant in the top portion of the beaker. Upon introducing the second volume of clay containing water, the floc size was substantially reduced and would not reform. Settling was minimal and clarity was unimproved. Flocculant solution 2 exhibited more gradual flocculant formation with settling that resulted in a somewhat similar supernatant quality. Upon introducing the second volume of clay containing water, the sample was agitated through inversion. The floc size was not reduced and the reserved ability of the initial polymer solution was able to effectively flocculate and produce clear supernatant. The same process was followed on subsequent test solutions. Solutions 3 and 6 were far superior to all of the other solutions that had a lower polyacrylamide molecular weight. Specifically, solutions 3 and 6 were able to provide a more substantial floc, better settling characteristics, greater floc shear resistance and the clearest supernatant of all samples tested. Subsequent testing of other polyacrylamide polymers blended with PEO (peo70%/pam30%) of 26 mmw Polyacrylamide demonstrated that anionic charges of 20, 30, 35, 40 offered no noticeable differences in performance in the ability to offer second stage clarification/separation of samples with the additional 500 ml clay/water additions. Also noted, follow up testing, 26 mmw anionic polyacrylamide PEO blends offer as much as 50% reduction in dosages over the slightly lower 22 mmw versions blended with PEO (to match floc size, supernatant clarity post second addition of 500 mls of clay/water). Testing indicates that PEO blended 70/30 with polyacrylamide benefits from higher mw polyacrylamides and that the benefit is not a function of ionic charge.

The embodiments above are intended to be illustrative and not limiting. Additional embodiments are within the claims. In addition, although the present invention has been described with reference to particular embodiments, those skilled in the art will recognize that changes can be made in form and detail without departing from the spirit and scope of the invention. Any incorporation by reference of documents above is limited such that no subject matter is incorporated that is contrary to the explicit disclosure herein.

What is claimed is:

1. A method for removing waste from a waste stream comprising waste water from a mining operation, the method comprising:
    combining a mixed aqueous solution of a flocculant composition with a waste stream flowing from a waste source to a thickening tank and comprising particulates to form settling flocculants, wherein the flocculant composition comprises polyethylene oxide polymer having a molecular weight of at least about 1 million g/mol and anionic polyacrylamide having an average molecular weight of at least about 15 million g/mol, wherein the flocculant composition is added to the waste stream at a dosage from about 1 part per million by weight to about 50 parts per million by weight of the waste water and wherein the mixed aqueous solution of the flocculant composition is effective to clarify the waste water to remove at least about 90 percent of solids initially present in the waste stream resulting in a clarified water flow;
    flowing the waste stream combined with the flocculant composition into the thickening tank; and
    draining concentrated tailings from the lower 20% of the thickening tank height, wherein the clarified water flow is removed from the top 40% of the thickening tank height.

2. The method of claim 1 wherein the polyethylene oxide polymer has an average molecular weight of at least about 5 million g/mol.

3. The method of claim 1 wherein the anionic polyacrylamide has an average molecule weight of at least about 22.5 million g/mol.

4. The method of claim 1 wherein the flocculant composition has a total polymer content equal to the total amount of polymer present in the flocculant composition and wherein the flocculant composition comprises at least about 35 weight percent polyethylene oxide polymer relative to the total polymer content.

5. The method of claim 1 wherein the flocculant composition has a total polymer content equal to the total amount of polymer present in the flocculant composition and wherein the flocculant composition comprises at least about 50 weight percent polyethylene oxide polymer relative to the total polymer content.

6. The method of claim 1 wherein the waste stream comprises clay particles and a solid concentration from about 1 weight percent to about 12 weight percent prior to the addition of the mixed aqueous solution of the flocculant composition.

7. The method of claim 6 wherein the flocculant composition is added to the waste stream at a dosage from about 5 part per million by weight to about 40 parts per million by weight of waste water.

8. The method of claim 6 wherein the mixed aqueous solution of the flocculant composition has a polymer concentration from about 0.0005 to about 0.2 weight percent.

9. The method of claim 1 wherein the clarified water flow has at least about 95% of solids removed.

10. The method of claim 1 wherein the combining of the mixed aqueous solution with the waste stream is performed at least about 10 meters upstream from a port into the thickening tank.

11. The method of claim 1 wherein the waste stream is a slime flow from phosphate mining, bauxite mining, coal washing, talc mining, or sand mining deposits.

12. The method of claim 11 wherein the waste stream comprises clay particles and a solid concentration from about 1 weight percent to about 12 weight percent prior to the addition of the mixed aqueous solution of the flocculant composition.

13. The method of claim 12 wherein the clarified water flow has at least about 95% of the solids removed.

14. The method of claim 12 wherein the flocculant composition is added to the waste stream at a dosage from about 5 part per million by weight to about 40 parts per million by weight of waste water.

15. The method of claim 12 wherein the mixed aqueous solution of the flocculant composition has a polymer concentration from about 0.0005 to about 0.2 weight percent.

16. The method of claim 1 wherein the flocculant composition is added to the waste stream at a dosage from about 5 part per million by weight to about 40 parts per million by weight of waste water.

17. The method of claim 1 wherein the mixed aqueous solution of the flocculant composition has a polymer concentration from about 0.0005 to about 0.2 weight percent.

* * * * *